United States Patent [19]
Beckerdite et al.

[11] Patent Number: 5,962,621
[45] Date of Patent: Oct. 5, 1999

[54] PROCESS FOR PREPARING HYDROXY-FUNCTIONALIZED POLYESTERS

[75] Inventors: John M. Beckerdite, Lake Jackson, Tex.; Shari L. Kram, Midland, Mich.; Ramki Subramania, Houston; Jerry E. White, Lake Jackson, both of Tex.; Michael N. Mang, Midland, Mich.

[73] Assignee: The Dow Chemical Company, Midland, Mich.

[21] Appl. No.: 09/069,015

[22] Filed: Apr. 28, 1998

[51] Int. Cl.$^6$ .................................................. C08G 63/00
[52] U.S. Cl. ............................................ 528/176; 528/297
[58] Field of Search ...................................... 528/176, 297

[56] References Cited

U.S. PATENT DOCUMENTS

| | | | |
|---|---|---|---|
| 4,438,254 | 3/1984 | Doorakian et al. | 528/89 |
| 4,480,082 | 10/1984 | McLean et al. | 528/103 |
| 5,089,588 | 2/1992 | White et al. | 528/99 |
| 5,115,075 | 5/1992 | Brennan et al. | 528/99 |
| 5,171,820 | 12/1992 | Mang et al. | 528/87 |
| 5,246,751 | 9/1993 | White et al. | 428/35.4 |

OTHER PUBLICATIONS

Cooper, "Molecular Weight Determination", Encyclopedia of Polymer Science and Engineering, Second Edition, vol. 10, pp. 1–19.

*Primary Examiner*—Terressa Mosley
*Attorney, Agent, or Firm*—Nemia C. Damocles

[57] ABSTRACT

A process for preparing a thermoplastic hydroxy-functionalized polyester comprises contacting a dicarboxylic acid or a mixture of dicarboxylic acids with a diepoxide in a given solvent in the presence of an end-capping agent and a catalyst under conditions sufficient to form the hydroxy-functionalized polyesters or polyethers.

27 Claims, No Drawings

PROCESS FOR PREPARING HYDROXY-FUNCTIONALIZED POLYESTERS

BACKGROUND OF THE INVENTION

This invention relates to a process for preparing hydroxy-functionalized polyesters.

When manufacturing polymers, it is desirable to be able to control the molecular weight. Unfortunately, polymers produced from the reaction of diepoxides and diacids, such as adipic acid, exhibit the tendency to increase in molecular weight over time, when held at polymerization temperatures. This can be a problem because it may take several hours to empty a reactor contents during which time the molecular weight of the polymer increases. This molecular weight increase occurs even when standard stoichiometric calculations suggest that no molecular weight build should be taking place.

It is known to control the molecular weight by adding a large excess of a mono-functional acid to the reactor contents when the desired molecular weight has been achieved. The disadvantage here is that the excess acid may need to be removed or the material of construction for the equipment associated with production may not be compatible with the acids used.

U.S. Pat. No. 5,171,820 describes a process for preparing hydroxy-functionalized polyesters by allowing a dicarboxylic acid and a diglycidyl ether to react in a solvent containing a quaternary ammonium halide as an initiator. This patent teaches that a monofunctional carboxylic acid can be added at the end of the polymerization reaction. This end-capping step does prevent the molecular weight build that might otherwise occur during an extended heating phase of commercial production, but it requires at least 10 weight percent of the monofunctional carboxylic acid to control the molecular weight.

It would be desirable to provide a process for preparing hydroxy-functionalized polyesters in a given solvent whereby the molecular weight of the polymer can be controlled by using a lower level of a capping agent than those used in the prior art.

SUMMARY OF THE INVENTION

The present invention is a process for preparing a hydroxy-functional polyester which comprises reacting dicarboxylic acids and diepoxides in a solvent in the presence of an end-capping agent and a catalyst under conditions sufficient to form the hydroxy-functionalized polyethers or polyesters. A feature of this invention is the addition of the end-capping agent at the beginning of the reaction along with the other starting materials. The end-capping agent can be added to the reaction prior to or at the point at which the product reaches maximum peak molecular weight or maximum number average molecular weight.

It has been found that adding the end-capping agent at the beginning of the reaction lowers the amount of monofunctional acids required to control the molecular weight of the polymer. It has also been found that adding the capping agent at the beginning of the reaction results in a more stable final product (with respect to excess molecular weight build) than if the same amount of capping agent is added at the end of the reaction or if excess monofunctional acid was used in the polymerization. Since only a small amount of capping agent is used, the process of the present invention eliminates the need to recover unreacted monofunctional acid from the polymer or solvent recovery system.

DETAILED DESCRIPTION OF THE INVENTION

The poly(hydroxy ester ethers) or poly(hydroxy esters) prepared by the process of the present invention have repeating units represented by the formula:

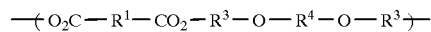

wherein $R^1$ is a divalent organic moiety which is primarily hydrocarbon; $R^3$ is:

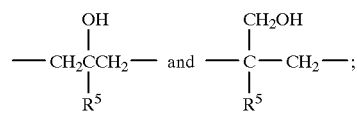

and $R^4$ is:

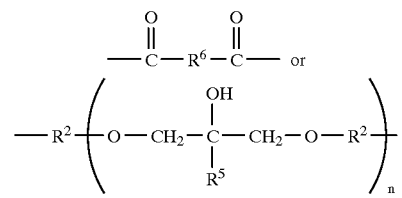

wherein $R^2$ and $R^6$ are independently divalent organic moieties which are primarily hydrocarbon; $R^5$ is hydrogen or alkyl and n is from 0 to 100.

In the preferred polymers, $R^1$, $R^2$ and $R^6$ are independently alkylene, cycloalkylene, alkylenearylene, alkyleneoxyalkylene, poly(alkyleneoxyalkylene), alkyleneamidealkylene, poly(alkyleneamidealkylene), alkylenethioalkylene, poly(alkylenethioalkylene), alkylenesulfonylalkylene, poly(alkylenesulfonylalkylene), arylene, dialkylenearylene, diaryleneketone, diarylenesulfone, diarylene oxide, alkylidene-diarylene, diarylene sulfide, or a combination of these moieties, optionally substituted with at least one hydroxyl group.

In the more preferred polymers, $R^1$ is methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene, optionally substituted with at least one hydroxyl group; and $R^2$ and $R^6$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene, optionally substituted with at least one hydroxyl group.

More preferably, $R^1$ and $R^6$ are represented by the formula:

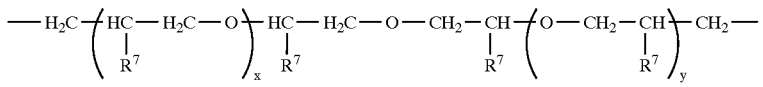

and R² is represented by the formula:

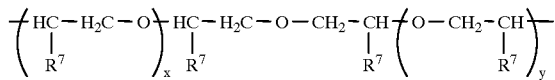

wherein $R^7$ is independently hydrogen or methyl and x and y are independently 0 to 100.

In the most preferred polymers, $R^1$ and $R^6$ are independently m-phenylene, p-phenylene or 2,6-naphthalene; $R^2$ is independently m-phenylene, p-phenylene, naphthalene, diphenylene-isopropylidene, sulfonyldiphenylene, carbonyldiphenylene, oxydiphenylene or 9,9-fluorenediphenylene; $R^5$ is hydrogen; $R^7$ is independently hydrogen or methyl.

Generally, the process of the present invention comprises reacting dicarboxylic acids and diepoxides in a given solvent in the presence of an end-capping agent and a catalyst under conditions sufficient to form the hydroxy-functionalized polyethers or polyesters. The end-capping agent is added at the beginning of the reaction along with the other starting materials.

The dicarboxylic acids which can be employed in the practice of the present invention include succinic acid, adipic acid, suberic acid, azaleic acid, sebacic acid, 1,10-decanedicarboxylic acid, 1,12-dodecanedicarboxylic acid, 1,4-cyclohexanedicarboxylic acid, tartaric acid, terephthalic acid and isophthalic acid.

The diepoxides which can be employed in the practice of the present invention include the diglycidyl ethers of dihydric phenols, such as those described in U.S. Pat. Nos. 5,246,751; 5,115,075; 5,089,588; 4,480,082 and 4,438,254, all of which are incorporated herein by reference, or the diglycidyl esters of dicarboxylic acids such as those described in U.S. Pat. No. 5,171,820. Other suitable diepoxides include α,ω-diglycidyloxy isopropylidene-bisphenol-based epoxy resins (commercially known as D.E.R.™ 300 and 600 series epoxy resins), α,ω-diglycidyloxy tetrabromoisopropylidene-bisphenol-based phenoxy resins, such as Quatrex™ 6410, both a product of The Dow Chemical Company. Preferred diepoxides are the epoxy resins having an epoxy equivalent weight of from about 100 to about 4000. Most preferred diepoxides are the diglycidyl ethers of bisphenol A; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-α-methylstilbene and the diglycidyl esters of the dicarboxylic acids mentioned previously.

The end-capping agents which can be employed in the practice of the present invention include monofunctional nucleophiles capable of reacting with an epoxide group and include monofunctional carboxylic acids, monohydric phenols, secondary amines and thiols. Preferred end-capping agents are monofunctional carboxylic acids. More preferred end-capping agents are benzoic acid, acetic acid and propionic acid, with the most preferred being propionic acid.

The process of the present invention requires only a fraction of the amount of end-capping agents employed in the previously described known processes. In general, the process of the present invention requires only from about 0.25 to about 3.0 mole percent of an end-capping agent (based on the diglycidyl ether or diglycidyl ester) in the polymerization mixture to effectively control the molecular weight build up that might otherwise occur during an extended heating phase of the commercial production of polymers.

In general, the reaction of the dicarboxylic acid and diepoxide requires a catalyst or any material capable of catalyzing the reaction. While any material capable of catalyzing the reaction can be used, the preferred catalysts are the onium catalysts. Preferred onium catalysts include the phosphonium or ammonium salt catalysts. More preferred onium catalysts include tetrabutylammonium bromide, ethyltriphenylphosphonium iodide, tetraphenylphosphonium bromide and tetrakis(n-butyl)ammonium bromide and the corresponding chloride, iodide, bromide, acetate, formate, phosphate, borate, trifluoroacetate, oxalate and bicarbonate, with tetrakis(n-butyl)ammonium bromide being most preferred.

The conditions at which the polymerization reaction is most advantageously conducted are dependent on a variety of factors, including the specific reactants, solvent, and catalyst employed, if any. In general, the reaction is conducted under a non-oxidizing atmosphere such as a blanket of nitrogen or other inert gases. The reaction can be conducted neat (without solvent or other diluents). However, in order to ensure homogeneous reaction mixtures and to moderate exothermic reactions at such temperatures, it is often desirable to use inert organic solvents, for the reactants.

The time and temperature most advantageously employed will vary depending on the specific monomers employed, particularly their reactivity, the specific oligomer, and the organic liquid. In general, the reaction temperature to form the polyesters or polyethers is from 80° C. to 220° C. and, most preferably, from 120° C. to 140° C., and for a time of from 30 minutes to 24 hours, more preferably from 3 hours to 24 hours and, most preferably, from 4 hours to 20 hours.

The concentrations at which the monomers are most advantageously employed in the organic liquid reaction medium are dependent on a variety of factors including the specific monomers and organic liquid employed and the polymer being prepared. In general, the monomers are employed in diacid to epoxy stoichiometric ratio of 0.8:1.0 to 1.2:1.0.

Any inert organic solvent which can dissolve the monomers to the appropriate degree and can be heated to the appropriate polymerization temperature either at atmospheric, subatmospheric or superatmospheric pressure, and does not interfere with the reaction of a carboxylic acid moiety with an epoxide moiety, could be used. Examples of suitable solvents include, cyclopentanone, cyclohexanone, cycloheptanone, cyclooctanone, cyclohexylpyrrolidinone; and ethers or hydroxy ethers such as dioxane, diglyme, triglyme, diethylene glycol ethyl ether, diethylene glycol methyl ether, dipropylene glycol methyl ether, dipropylene glycol dimethyl ether, propylene glycol phenyl ether, propylene glycol methyl ether acetate, propylene glycol methyl ether and tripropylene glycol methyl ether; toluene, mesitylene, xylene, benzene, dipropylene glycol monomethyl ether acetate, halogenated solvents such as dichlorobenzene; propylene carbonate, naphthalene, diphenyl ether, butyrolactone, dimethylacetamide, dimethylformamide, esters such as ethyl acetate or butyl acetate and mixtures thereof. The preferred solvents are diglyme, dioxane and propylene glycol methyl ether acetate.

During polymer synthesis, the polymers are recovered from the reaction mixture by conventional methods. For example, the reaction mixture containing the polymer as a precipitate can be filtered to remove the solid polymer. The solid monomer can then be rinsed with water, methanol, and ether or other solvents which are non-solvents for the polymer, but good solvents for the impurities. The polymer also can be isolated by pouring the reaction mixture into a non-solvent for the polymer and collecting the precipitated product. Additionally, the product polymer can be isolated by removal of the solvent by vacuum distillation, wiped-film evaporation or devolitilization extrusion.

The following examples are for illustrative purposes only and are not intended to limit the scope of this invention. Unless otherwise indicated, all parts and percentages are by weight.

EXAMPLE 1

A 1-liter reaction vessel fitted with a mechanical stirrer (air-driven), condenser (cold water) and nitrogen inlet (for maintaining a pad of nitrogen) is used for this reaction. The temperature is controlled using a heating mantle and a Thermal-watch® temperature controller (glass thermometer is used). The reactant, D.E.R. 331™ (186.1 g), adipic acid (73.07 g), propionic acid (0.37 g), tetrabutyl ammonium bromide (TBA Br) (1.66 g) and propylene glycol methyl ether acetate (261 g) are weighed in directly into the reaction vessel. Total solids is 50%.

The reaction mixture is stirred and heated to 120° C. An aliquot is taken out every hour (for the first 7 hours) and the GPC and inherent viscosity measurements are done. The results are shown in Table I.

The reaction mixture is diluted with THF to about 20% solids and the polymer is precipitated in water. The reaction mixture is poured into a high speed blender containing cold hexane in order to precipitate the PHEE polymer. This needs to be done several times in order to remove the propylene glycol methyl ether acetate from the polymer. The product is then dried in a vacuum oven at 35° C. for 24 hours.

Comparative Example A

The procedure described in Example 1 is repeated, except that the propionic acid is added at the end instead of at the beginning of the polymerization. The results are shown in Table I.

TABLE I

| | Propionic Acid Added at Beginning of Reaction | | | Propionic Acid Added at End of Reaction | | |
|---|---|---|---|---|---|---|
| Time (hr.) | $M_w^1$ | $M_p^2$ | $M_n^3$ | $M_w^1$ | $Mp^2$ | $M_n^3$ |
| 0 | 710 | 255 | 429 | 471 | 255 | 322 |
| 1 | 7977 | 7577 | 3395 | 2292 | 1651 | 1066 |
| 2 | 22506 | 21722 | 7049 | 9881 | 9324 | 3745 |
| 3 | 32114 | 27522 | 8513 | 49392 | 26001 | 6609 |
| 4 | 35354 | 28150 | 8338 | 67818 | 31329 | 7820 |
| 5 | 36513 | 28553 | 8109 | 74546 | 30299 | 7725 |
| 6 | 37192 | 28553 | 8645 | 82245 | 31681 | 8372 |
| 7 | 37823 | 28756 | 8145 | 91814 | 31069 | 7710 |

TABLE I-continued $^1M_w$ = weight average molecular weight.
$^2M_p$ = peak molecular weight.
$^3M_n$ = number average molecular weight.

The terms "weight average molecular weight" and "number average molecular weight" are well known in the art and are described, for example, in the *Encyclopedia of Polymer Science and Engineering*, John Wiley and Sons, Second Edition, Vol. 10, p.1–11. The term "peak molecular weight" refers to the weight average molecular weight of the polymer at the peak of the reaction.

The data in the above table show that adding propionic acid at the end of the reaction does not help in controlling the molecular weight as adding the propionic acid at the beginning of the reaction does.

The data also show that the peak and number average molecular weight of the polymer reach a maximum value after a few hours into the reaction and remain constant whereas weight average molecular weight keeps increasing as a function of time under a given set of conditions.

EXAMPLE 2

The procedure described in Example 1 is repeated, except that benzoic acid is used instead of propionic acid as the end-capping agent. The results are shown in Table II.

TABLE II

| Time (hours) | $M_p$ | $M_n$ | $M_f$ |
|---|---|---|---|
| 0 | 255 | 306 | 419 |
| 1 | 5369 | 2138 | 5678 |
| 2 | 14868 | 5897 | 19037 |
| 3 | 27184 | 6761 | 32436 |
| 4 | 27796 | 6855 | 34624 |
| 5 | 29062 | 7289 | 39705 |
| 6 | 29062 | 7195 | 40066 |
| 7 | 28776 | 7239 | 41514 |
| 8 | 28896 | 7026 | 42130 |

The polymers prepared by the process of the present invention are useful in preparing barrier containers and films, and as molding, extrusion and casting resins, in fabricating molded, extruded or foamed articles, containers, films, film laminates, or coatings using conventional fabricating techniques such as extrusion, compression molding, injection molding, blow molding and similar fabrication techniques commonly used to produce such articles. Examples of such articles include films, foams, sheets, pipes, rods, bags and boxes.

What is claimed is:

1. A process for preparing thermoplastic hydroxy-functionalized poly(ester ethers) or polyesters which comprises providing a reaction mixture of at least one dicarboxylic acid and a diepoxide, adding an end-capping agent to the reaction mixture and subjecting the reaction mixture in the presence of a catalyst and a solvent under conditions sufficient to form the hydroxy-functionalized polyesters.

2. The process of claim 1 wherein the dicarboxylic acid is succinic acid, adipic acid, suberic acid, azaleic acid, sebacic acid, 1,10-decanedicarboxylic acid, 1,12-dodecanedicarboxylic acid, 1,4-cyclohexanedicarboxylic acid, tartaric acid, terephthalic acid, isophthalic acid or combinations thereof.

3. The process of claim 1 wherein the diepoxide is a diglycidyl ether of a dihydric phenol.

4. The process of claim 1 wherein the diepoxide is the diglycidyl ether of bisphenol A; 4,4'-sulfonyldiphenol; 4,4'-oxydiphenol; 4,4'-dihydroxybenzophenone; resorcinol; hydroquinone; 9,9-bis(4-hydroxyphenyl)fluorene; 4,4'-dihydroxybiphenyl, 4,4'-dihydroxy-α-methylstilbene, or combinations thereof.

5. The process of claim 1 wherein the diepoxide is a diglycidyl ester of a dicarboxylic acid.

6. The process of claim 5 wherein the diglycidyl ester is a diglycidyl ester of succinic acid; adipic acid; suberic acid; azelaic acid; sebacic acid; 1,10-decanedicarboxylic acid; 1,12-dodecanedicarboxylic acid; 1,4-cyclohexanedicarboxylic acid; tartaric acid; terephthalic acid, isophthalic acid, or combinations thereof.

7. The process of claim 1 wherein the diglycidyl ether or diglycidyl ester has an epoxy equivalent weight of from about 100 to about 4000.

8. The process of claim 1 wherein the catalyst is an onium catalyst.

9. The process of claim 8 wherein the onium catalyst is a phosphonium or ammonium salt catalyst.

10. The process of claim 9 wherein the onium catalyst is ethyltriphenylphosphonium iodide, tetraphenylphosphonium bromide or tetrakis(n-butyl)ammonium bromide, chloride, iodide, acetate, formate, phosphate, borate, trifluoroacetate, oxalate or bicarbonate.

11. The process of claim 10 wherein the onium catalyst is tetrakis(n-butyl)ammonium bromide.

12. The process of claim 1 wherein the catalyst is present in an amount of from about 0.001 to 10 mole percent, based on the number of moles of dicarboxylic acid in the reaction mixture.

13. The process of claim 1 wherein the end-capping agent is a monofunctional carboxylic acid or a monohydric phenol.

14. The process of claim 13 wherein the end-capping agent is a monofunctional carboxylic acid.

15. The process of claim 14 wherein the monofunctional carboxylic acid is propionic acid, acetic acid or benzoic acid.

16. The process of claim 15 wherein the monofunctional carboxylic acid is propionic acid.

17. A process for preparing thermoplastic hydroxy-functionalized poly(ester ethers) or polyesters which comprises providing a reaction mixture of at least one dicarboxylic acid and a diepoxide, reacting the dicarboxylic acid and diepoxide in the presence of a catalyst and a solvent under conditions sufficient to form the hydroxy-functionalized polyesters and adding an end-capping agent to the reaction prior to the point at which the product reaches maximum peak or number average molecular weight.

18. The process of claim 1 wherein the end-capping agent is added to the reaction in an amount of from about 0.25 to about 3.0 mole % based on diglycidyl ether or diglycidyl ester in the polymerization mixture.

19. A process for preparing thermoplastic hydroxy-functionalized poly(ester ethers) or polyesters which comprises providing a reaction mixture of at least one dicarboxylic acid and a diepoxide, reacting the dicarboxylic acid and diepoxide in the presence of a catalyst and a solvent under conditions sufficient to form the hydroxy-functionalized polyesters and adding an end-capping agent to the reaction at the point at which the product reaches maximum peak or number average molecular weight.

20. The process of claim 1 wherein the solvent is an ether or polyether or a substituted ether or polyether, the substituent being a compound which does not interfere with the reaction of a carboxylic acid moiety with an epoxide moiety.

21. The process of claim 1 wherein the solvent is an ester.

22. The process of claim 1 wherein the solvent is diglyme, dioxane, or propylene glycol methyl ether acetate.

23. The process of claim 1 which comprises mixing a dicarboxylic acid, an end-capping agent, a catalyst, a diglycidyl ether or diglycidyl ester and a solvent at a temperature sufficient to dissolve all of the reactants and for a time sufficient to produce a poly(hydroxy ester ether) or poly(hydroxy ester).

24. The process of claim 23 wherein the reaction temperature is from 100° C. to 220° C. and the reaction time is from 4 to 24 hours.

25. The process of claim 1 which further comprises isolating the poly(hydroxy ester ether) or poly(hydroxy ester) polymer by precipitating it from a solvent in which the polymer is insoluble.

26. The process of claim 1 which further comprises isolating the poly(hydroxy ester ether) or poly(hydroxy ester) polymer by removing the solvent by vacuum distillation, wiped-film evaporation, and/or devolatilization extrusion and, optionally, pelletizing the polymer.

27. A poly(hydroxy ester ether) or poly(hydroxy ester) prepared by the process of claim 1.

* * * * *